US007861286B2

(12) United States Patent
M'Raihi et al.

(10) Patent No.: US 7,861,286 B2
(45) Date of Patent: Dec. 28, 2010

(54) SYSTEM AND METHOD FOR NETWORK-BASED FRAUD AND AUTHENTICATION SERVICES

(75) Inventors: David M'Raihi, San Carlos, CA (US); Joseph Adler, Mountain View, CA (US); Siddharth Bajaj, San Francisco, CA (US); Nicolas Popp, Menlo Park, CA (US); Kerry E. Loftus, Los Altos, CA (US); Bruce Ong, San Francisco, CA (US); Alin M. Mutu, Fremont, CA (US); Jeffrey Burstein, San Jose, CA (US); Yueqin Lin, San Jose, CA (US)

(73) Assignee: Symantec Software Corporation, Mountain View, CA (US)

( * ) Notice: Subject to any disclaimer, the term of this patent is extended or adjusted under 35 U.S.C. 154(b) by 950 days.

(21) Appl. No.: 11/705,064

(22) Filed: Feb. 12, 2007

(65) Prior Publication Data
US 2007/0220595 A1 Sep. 20, 2007

Related U.S. Application Data

(60) Provisional application No. 60/771,861, filed on Feb. 10, 2006.

(51) Int. Cl.
*G06F 7/04* (2006.01)
*G06F 15/16* (2006.01)
*G06F 17/30* (2006.01)
*H04L 29/06* (2006.01)
*G06F 21/00* (2006.01)

(52) U.S. Cl. .......................... 726/5; 713/186

(58) Field of Classification Search ................ 726/5; 713/186
See application file for complete search history.

(56) References Cited

U.S. PATENT DOCUMENTS

| 5,748,742 | A   * | 5/1998  | Tisdale et al. ............... 380/249 |
| 2005/0273442 | A1 * | 12/2005 | Bennett et al. ................ 705/67 |
| 2005/0278192 | A1 * | 12/2005 | Cantini et al. ................. 705/1 |
| 2006/0157553 | A1 * | 7/2006  | Kelley et al. ................ 235/380 |
| 2007/0079136 | A1 * | 4/2007  | Vishik et al. ................ 713/186 |

OTHER PUBLICATIONS

The International Search Report corresponding to the PCT/US07/03822 application mailed Dec. 26, 2007.

* cited by examiner

*Primary Examiner*—Shin-Hon Chen
(74) *Attorney, Agent, or Firm*—Townsend and Townsend and Crew LLP

(57) ABSTRACT

A system and method for providing identity protection services. According to an embodiment, a validation server receives over a network a response from a credential associated with a user, the credential response provided by the user in order to authenticate the user to one of a plurality of sites on the network that accepts the credential as a factor for authentication, the validation server verifies the credential response on behalf of the one network site, a fraud detection server receives over the network information in connection with a transaction associated with the user at the one network site, and the fraud detection server evaluates the transaction information for suspicious activity based at least in part on information provided to the fraud detection server in connection with one or more transactions at one or more sites on the network other than the one network site.

17 Claims, 6 Drawing Sheets

SYSTEM AND METHOD FOR NETWORK-BASED FRAUD AND AUTHENTICATION SERVICES

CROSS REFERENCE TO RELATED APPLICATIONS

This application claims the benefit under 35 U.S.C. §119 (e) of U.S. Provisional Application No. 60/771,861, filed Feb. 10, 2006, which is hereby incorporated by reference in its entirety.

BACKGROUND OF THE INVENTION

Identity theft has continued to grow, and the extent of the problem is significant. Each year, millions of adults in the U.S. have their identities stolen and tens of millions of accounts are compromised, leading to losses from identity theft in the billions. While the fraud losses themselves are significant, even more worrisome has been the negative impact to enterprises whose consumers have been victim to these breaches. Account churn, lower transaction volume and even lower stock prices have made the extent of the losses harder to bear for most enterprises.

Given the impact of identity theft on online businesses and the regulatory guidance around strengthening authentication, more and more enterprises are evaluating authentication options for their online consumer base. Weak authentication has led to Internet identity theft, phishing, and on-line financial fraud. As more consumers use computers and mobile devices for shopping, managing their finances, and accessing health care information, the risk of fraud and identity theft increases.

For many years, enterprises have used strong authentication to secure employee and business-partner access to corporate networks and applications. The risk of enabling unauthorized access to corporate assets justified the investment and change in behavior needed to deploy strong authentication and made for a fairly straightforward risk/reward evaluation for the enterprise. However, because these enterprise solutions were designed for lower volume deployments, utilizing them for securing consumer applications is not entirely feasible. Scaling these enterprise authentication solutions to millions of users in a cost effective manner is nearly impossible.

Accordingly, there is a need in the art for a system and method to improve identity protection for consumers.

DETAILED DESCRIPTION

The present invention addresses the deficiencies of current solutions by providing to a network of enterprises both authentication and fraud detection services that are hosted by a third party service provider. These services minimize costs and maximize security by sharing intelligence and resources among the network of enterprises that utilize the hosted services. The service provider is able to share authentication credentials among the participating enterprises utilizing the hosted authentication services, and is able to share fraud intelligence (e.g., fraud data and signatures) among the participating enterprises utilizing the hosted fraud detection services. This approach combats digital identity theft on behalf of both consumers and online services without sacrificing the convenience of everyday web lifestyles.

Figure 1:
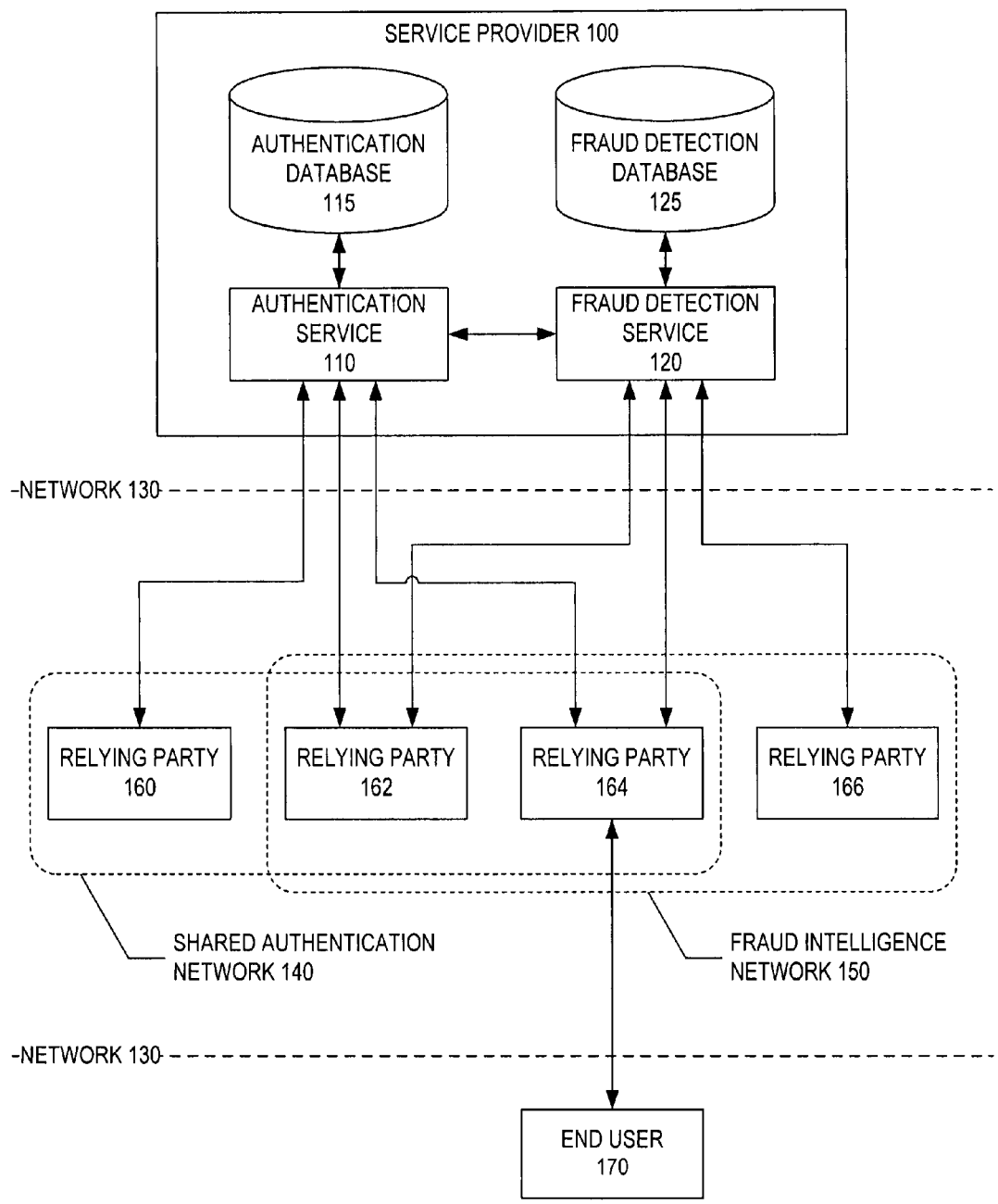
FIG. 1 is a block diagram that depicts a system of network-based authentication and fraud detection services in accordance with an embodiment of the present invention.

FIG. 1 depicts a system of network-based authentication and fraud detection services in accordance with an embodiment of the present invention. A third party service provider (100) provides an authentication service (110) and fraud detection service (120) to a number of sites (160, 162, 164, 166) on a network (130) that rely on the service provider (100) for those services (110, 120). These relying parties (160, 162, 164, 166) engage in these services (110, 120) to protect the identity of an end user (170) who may desire to transact with one of the relying parties (164).

Information stored in a database (115) used by the authentication service (110) may be used by the fraud detection service (120). Similarly, information stored in a database (125) used by the fraud detection service (120) may be used by the authentication service (110).

The relying parties (160, 162, 164) that utilize the hosted authentication service (110) are considered part of a shared authentication network (140), and the relying parties (162, 164, 166) that utilize the hosted fraud detection service (120) are considered part of a fraud intelligence network (150).

In connection with the hosted authentication service (110), each party in the shared authentication network (140) accepts the same authentication credentials as other participating members of the network. This enables end users to utilize a single authentication credential, no matter the form (e.g., OATH-compliant), across any sites of the participating network members. This helps solve the "necklace" problem that occurs when an end user needs a separate credential to transact with different relying parties.

A credential refers to any electronic device or document used for authentication purposes. The value provided by a credential for validation is referred to as a credential response (e.g., an OTP ("One-Time Password") value, a digital signature, or a response to a challenge-response query). For example, an OTP token (sometimes just called a token) is a hardware device credential that generates a unique code on demand that is usually used, for example, as a second factor for authentication.

Second factor authentication refers to authenticating something that the user has or something the user is. (the second factor) rather than or in addition to something the user knows (the first factor). In a system that employs first and second factor authentication, if an attacker steals only a first factor, the attacker would not be able to forge the second factor and would be unable to authenticate. If an attacker steals the second factor, the attacker would not know the first factor and would be unable to authenticate.

There may be many different types of secondary factors, such as hardware tokens, digital certificates, and biometric devices. Additionally, an authentication service may require more than two factors. For example, a system might require a pass phrase, digital certificate, and thumbprint sensor, combining something the user knows, something the user has, and something the user is.

A second factor network is an elegant way to facilitate using a single, easy to use device. An end user receives a single device that works the same way everyplace in the network. A user simply registers the device with a service that supports the second factor network, and is ready to authenticate. If the user loses or breaks the device, the user contacts the issuer of the device and each relying party learns of the change in status. Service providers do not have to worry about managing end user credentials and devices, but simply contact the network.

In connection with the hosted fraud detection service (120), each party in the fraud intelligence network (150) shares fraud intelligence (e.g., web browser headers, IP addresses, etc.) to further maximize identify protection. By sharing transaction information from across the network (150), the fraud detection service (120) can compare patterns of behavior across the participating sites in real time, and help detect and stop attacks that could not be detected with data from a single site. The service (120) does not require personally identifiable information to detect fraud, but can use unique pseudonyms to identify end users across the different sites.

The service provider 100 may query external sources to gain network level intelligence derived apart from the fraud intelligence network information. Such intelligence may involve information associated with the DNS infrastructure of the Internet, such as IP geolocation data, connection type, network provider, GPS data, Home Location Register data, calling and called telephone (land-based and/or cellular) data, etc.

The fraud detection service (120) is therefore able to better combat criminals on the internet who use many different mechanisms to capture personal information, such as phishing web sites, key loggers, false store fronts, and database theft. Often, criminals try to use the same information on multiple web sites, testing login information by trial and error, establishing multiple fraudulent accounts, or other malicious activities.

Figure 2:
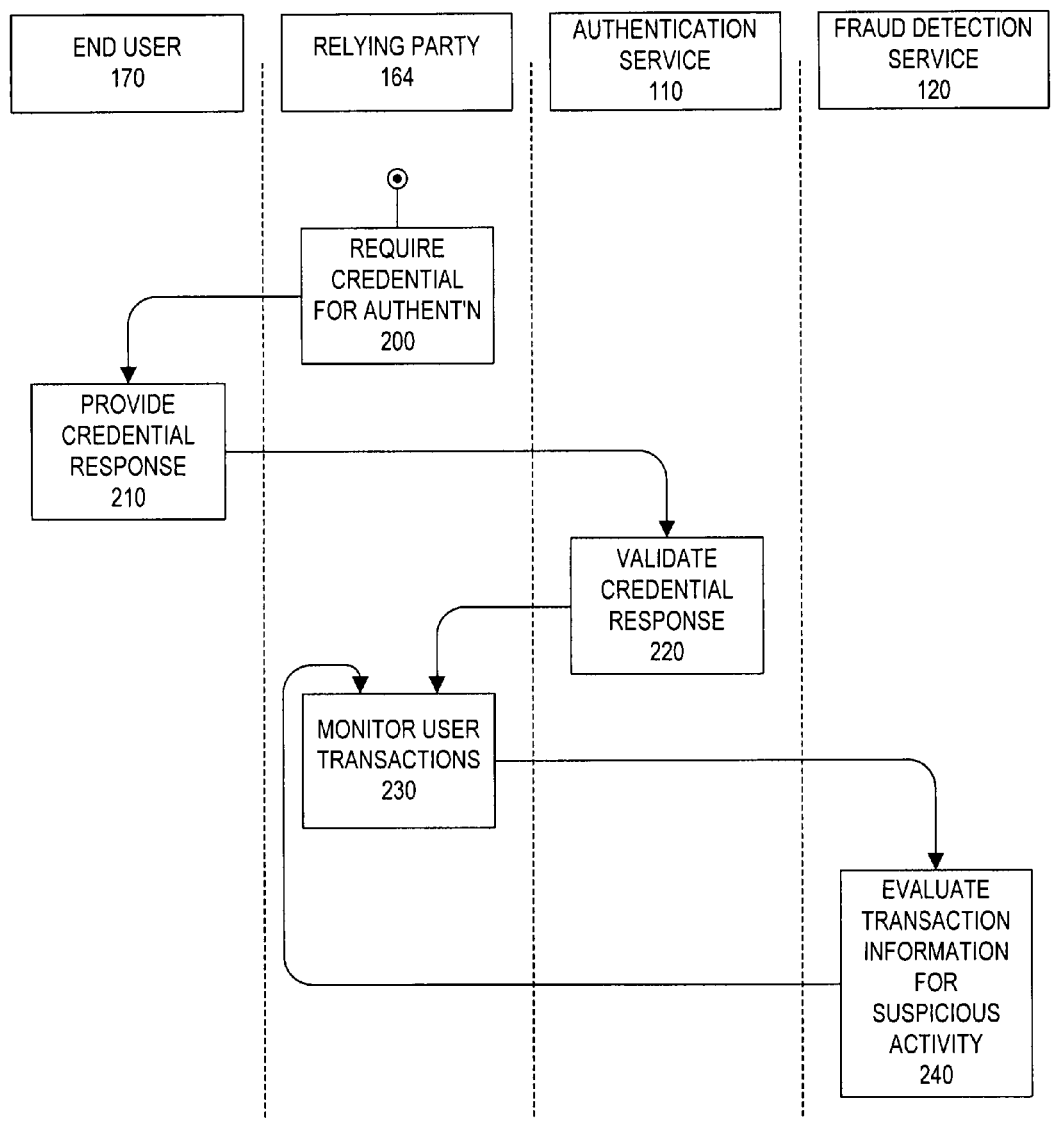
FIG. 2 is a flow chart that depicts a process for providing authentication and fraud detection services in accordance with an embodiment of the present invention.

FIG. 2 depicts a process for network-based authentication and fraud detection in accordance with an embodiment of the present invention. When a relying party (164) requires (step 200) a credential to authenticate an end user (170), the user (170) provides (step 210) a credential response associated with a credential possessed by the user (170) to be validated (step 220) by an authentication service (110).

In one embodiment of the present invention, the user (170) may provide the credential response to the relying party (164), who then checks the information with the authentication service (110) via a backend integration. In another embodiment, the relying party (164) may redirect the user (170) to the authentication service (110) to enter the credential response. In this embodiment, the authentication service (110) creates a digitally signed assertion—stating whether the attempt was good or bad—and encodes it into a short ASCII string that can be attached to a URL to be passed back to the relying party (164) using an http redirect. In yet another embodiment, the relying party (164) may utilize AJAX (Asynchronous Javascript and XML) so that, instead of redirecting the user's web browser to different web pages, Javascript on the relying party's (164) page is used to forward the credential response to the authentication service (110) (e.g., via an XMLHttpRequest call) and receive the resulting assertion.

The relying party (164) then monitors (step 230) transactions associated with the user (170), which may include a login, purchase, click-thru, or any other activity by the user (170) on the relying party's (164) site, and provides information associated with the transactions to the fraud detection service (120) to be evaluated (240) for suspicious activity. To improve security, the fraud detection service (120) evaluates the transaction information for suspicious activity based at least in part on other transaction information provided to the fraud detection service (120) by the fraud intelligence network (150) sites.

Figure 3:
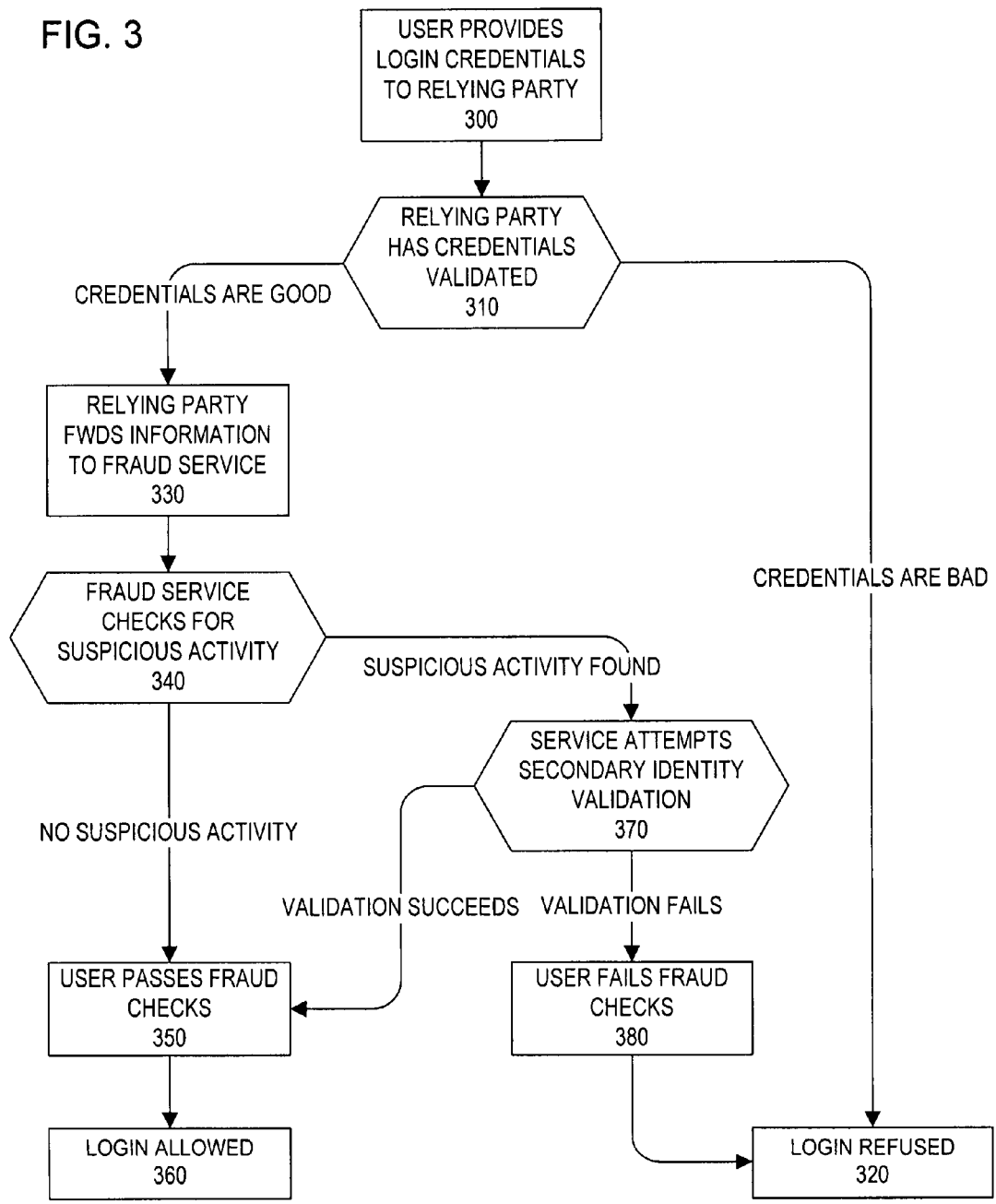
FIG. 3 is a flow chart that depicts a two-phase fraud detection process in accordance with an embodiment of the present invention.

FIG. 3 is a flow chart that depicts a two-phase fraud detection process in accordance with an embodiment of the present invention. First, a user (170) provides (step 300) login credentials to a relying party (164) for validation (step 310). If the credentials are bad, the login is refused (step 320), and if the credentials are good, then the relying party (164) forwards (step 330) information associated with the user's login to a fraud detection service (120).

The fraud detection service (120) checks (step 340) for suspicious activity, and if no suspicious activity is found, the transaction passes (step 350), the relying party (164) is informed of the decision, and the user (170) is allowed (step 360) to log in.

If, on the other hand, the primary check reveals suspicious activity, then the fraud detection service (120) proceeds (step 370) to use more sophisticated, complex, and invasive techniques to validate that the credential is legitimate. After this secondary check, the fraud detection service (120) decides if the transaction is fraudulent or legitimate.

The primary fraud checks may be based on properties of the transaction, properties of the user account, and transaction history. No human intervention is required; these checks may be completely automated. More importantly, no extra steps are added to the process.

The secondary fraud checks add additional steps to the process. The fraud detection service (120) may require a telephone, email, or SMS confirmation of the user's identity. Alternately, the system may ask additional challenge/response questions of the user (170). The purpose of these checks is to provide additional information to validate the user's identity. If the secondary checks succeed, the fraud check succeeds (step 350), and the user is allowed to log in (step 360).

If the secondary checks fail, the fraud check fails (step 380) and the fraud detection service (120) reports the failure to the relying party (164). The relying party (164) may refuse (step 320) the login request, and may choose to refer the customer to customer service for resolution.

In an embodiment of the present invention, information associated with a refused login based on step 310 may also be sent to the fraud detection service (120) by the relying party (164).

In order to check for suspicious activity, the fraud detection service (120) may be fed information about each transaction. Using a scoring model or rules, the service (120) outputs a decision. Each decision, and all transaction details, may then be saved to a transaction log. Periodically, an Extraction Translation and Loading (ETL) process may be used to calculate some information for a transaction history database (125). Some details about recent transactions may also be saved directly to the transaction history database (125) (e.g., simple, easy to calculate information). A scoring engine may also query a database containing information from external sources (such as IP geolocation data, GPS data, Home Location Register data, calling and called telephone (land-based and/or cellular) data, etc.) that can be used to enhance decisions.

The scoring engine is designed to distinguish between good and bad authentication attempts. There are two types of login transactions: legitimate authentication attempts and fraudulent authentication attempts. In order to distinguish between the two, the engine attempts to learn whether a login does not fit a pattern of other legitimate attempts, and whether a login fits the pattern of other fraudulent attempts.

Over time, a good picture of what a legitimate login attempt looks like for each account can be developed by the engine. For example, suppose that a user in Minnesota uses a token to access his trading account. Over time, it might become evident that he usually logs in only during market hours, only logs in 3-4 times per week, and only logs in from an IP address in the Midwest.

Any deviation from this pattern is a sign of suspicious activity. For example, the engine will deem suspicious transaction information that shows twenty attempted authentications at midnight EST from Russia. The engine characterizes the usual usage pattern and then looks for deviations from that pattern.

Other examples of baseline behavior could be based upon the known geolocation of the user, which can be compared to actual location data obtained from a GPS system associated with the user (e.g., embedded in his cell phone, where the interface for logging in is, for example, through the cell phone), Home Location Register information, called number information, etc. Any unusual discrepancy between his known location and these locations could indicate fraud. Furthermore, any discrepancy among these data could indicate fraud. For instance, if the GPS data indicates Minnesota and the Home Location Register data indicates New York, fraud may be suspected and anti-fraud measures implemented.

A picture of fraudulent login attempts can also be developed by the engine over time. For example, it might become evident that many fraudulent login attempts are through anonymous IP proxies, or from Eastern European countries. It might become evident that fraudulent attempts try to use a token at the wrong web site, or that dictionary attacks are made against a token (e.g., systematically testing different PIN codes with a token), etc. Rules can be coded to detect and counter practically any kind of fraudulent behavior.

In order to detect fraud, the fraud detection service (120) needs to collect enough information about each transaction to make a reasonable guess. In order to capture broad enough information, the following fields can be used:

Token serial number (or token group ID)
Token type (OTP, PKI, etc.)
Time of transaction
IP address of token user
Web site/System the user is trying to access
Transaction the user is attempting (i.e., login, purchase, stock trade, etc.)
Approximate transaction value
Result of authentication attempt (good or bad OTP, good or bad PIN, wrong site, etc.)

The fraud detection service (120) also needs to capture deep enough information. This means producing a historical record of transactions, going back at least 90 days and preferably for a year, for example. Over time, summary information could be built (such as the average number of logins per month) that could be used to look for suspicious activity.

The fraud detection service (120) analyzes a transaction by a policy engine and, depending on the policy, is passed through an anomaly engine which answer with a status (anomaly or not) and a confidence factor (how much the engine is confident in its decision) that is processed back by the policy engine. The following provides an embodiment of the data flow process:

Data arrives into the system through a data adapter
The policy engine runs rules that are relevant to the events
If required, the policy engine passes the events to the anomaly engine for anomaly detection
The policy engine receives back a result which is structured as a status (is anomaly?) and confidence factor
According to the confidence factor and the status, the policy engine issues additional events, including user defined actions and internal analytics Each rule may have a condition and a list of actions. For example, a condition can be that an event occurred, data in a graph changed, fact value changed, etc. An action can be to change data in a graph, set a fact value, send an email, run a script, etc. The rules may be grouped into policies. Each policy may have a Name, an attribute (Enable/Disable) and a Durability (schedule of when the policy is active). Policies may be logically stored in directories.

In addition to providing functionality around setting filters based around how anomalous and how confident the engine is in the decision, the fraud detection service (120) may use its determinations for further increasing accuracy. For example, if a transaction is tagged as anomalous, even with a high anomaly score and confidence factor, the system can increase its accuracy by comparing the transaction against a cluster of known fraudulent transactions or known "not" fraudulent transactions.

In order to achieve this unsupervised learning, the fraud detection service (120) may utilize clustering algorithms in its anomaly engine to decide which of the user's actions correspond to natural behavior and which are exceptional, without any assistance.

The clustering algorithm may be based on the ROCK hierarchical clustering algorithm (RObust Clustering using linKs), which is an agglomerative hierarchical clustering algorithm based on the notion of neighbors and links as follows.

Two data elements are considered as neighbors if our similarity upon a domain expert or similarity matrix exceeds a certain threshold. At first, all n data elements are mapped to n clusters respectively. Then, with each iteration, the engine merges between the two closest clusters such that both clusters fulfill the maximum value of $Link(C_i,C_j)$, for any pair of clusters $C_i$ and $C_j$. The metric $Link(C_i,C_j)$ represents the number of common neighbors between every element in the first cluster to every element in the second one.

This measure is normalized by the number of potential neighbors in both clusters, so that a large cluster will not swallow every other cluster and end up with all the elements. Grouping the data elements using links injects global knowledge into the clustering process, forming an optimal division between the elements. Thus, the formed clusters aren't too large or too small, and the clusters contain elements that are relatively similar one to another.

The engine utilizes enhancements to the ROCK algorithm that adapt it to the overall anomaly detection process. Namely, the enhancements significantly improve the clustering phase's execution time and transform the ROCK's ability of finding clusters to the ability of finding anomalies. Additional to these enhancements, the engine utilizes enhancements on the algorithmic level as follows.

Like other clustering algorithms, the ROCK also expects an argument that determines the number of clusters to generate. The enhanced algorithm, on the other hand, produces the real amount of clusters, representing each of the user's behavioral patterns, as they actually appear within the data.

Additionally, the algorithm introduces the notion of clustering execution levels, which allow for different clustering configurations to be defined for various situations. If, for example, the anomaly detection process is started with a relatively sparse data set, then engine may want to activate the clustering phase with reduced similarity thresholds, since the number of common neighbors between pairs of data elements is bound to be small.

This enables the engine to perform fraud detection at early stages of the data collection, without generating false positives or false negatives. In each execution level, the minimum number of transactions, similarity threshold, confidence factor and the participating attributes can be defined.

Figure 4:
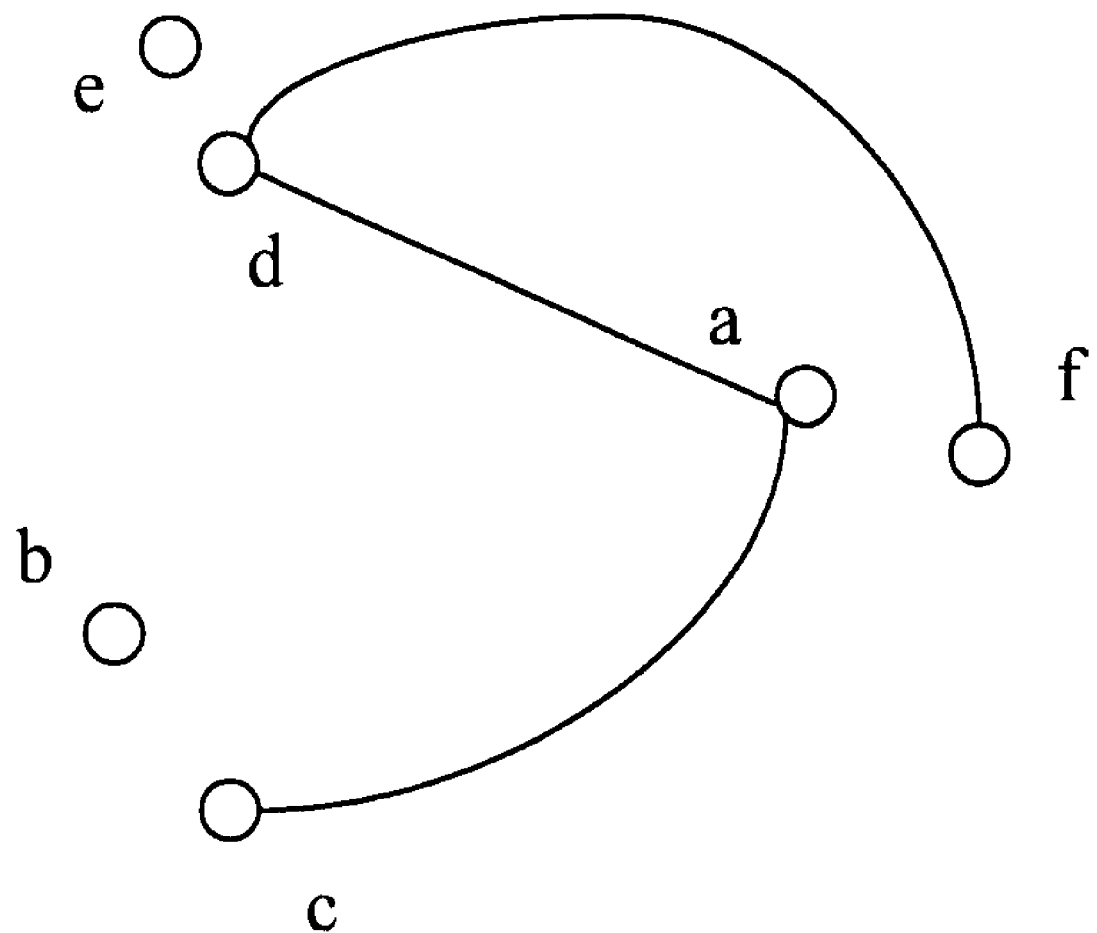
FIG. 4 is a graph upon which a clustering algorithm may be applied in accordance with an embodiment of the present invention.

FIG. 4 depicts a graph upon which the enhanced clustering algorithm may be applied in accordance with an embodiment of the present invention.

First Step:
Let S be the similarity function. Compute $S(x, y)$ for all elements.
Similarity is defined in this example as being "close" to each other or being connected.
Second Step:
Build the neighbor matrix:

$M(x,y)=1$ if $S(x,y)>T$ a certain Threshold value.

In this example, for instance: $M(e,d)=1$ and $M(d,f)=1$ because e and d are close, and d and f are connected; but $M(a,b)=0$ because they are far apart and not connected.
The full Matrix is represented in TABLE 1:

TABLE 1

|   | a | b | c | d | e | f |
|---|---|---|---|---|---|---|
| a | 1 | 0 | 1 | 1 | 0 | 1 |
| b | 0 | 1 | 1 | 0 | 0 | 0 |
| c | 1 | 1 | 1 | 0 | 0 | 0 |
| d | 1 | 0 | 0 | 1 | 1 | 1 |
| e | 0 | 0 | 0 | 1 | 1 | 0 |
| f | 1 | 0 | 0 | 1 | 0 | 1 |

Third Step:
Create the Link Matrix.
The number of common neighbors are calculated for each pair (x,y) of elements.
So for example upon taking a and c in TABLE 2:

TABLE 2

| a | 1 | 0 | 1 | 0 | 0 | 1 |
|---|---|---|---|---|---|---|
| c | 1 | 1 | 1 | 0 | 0 | 0 |

The number of common neighbors is 2. The link matrix for this example is shown IN TABLE 3:

TABLE 3

|   | a | b | c | d | e | f |
|---|---|---|---|---|---|---|
| a | — |   |   |   |   |   |
| b | 1 | — |   |   |   |   |
| c | 2 | 2 | — |   |   |   |
| d | 2 | 0 | 0 | — |   |   |
| e | 0 | 0 | 0 | 1 | — |   |
| f | 2 | 0 | 1 | 0 | 1 | — |

Last Step:
Criterion functions
Maximize the sum of Link(x, y) for x and y belonging to the same cluster
Minimize the sum of Link(x, y) for x and y belonging to different clusters Intuitively, the idea is to be sure that within a cluster, elements have as many common neighbors as possible while at the same time, these elements are as "dissimilar" as possible from the elements in other clusters.

Based on these metrics, a goodness measure is also calculated to decide on whether to merging the clusters or not—the generalization from points to clusters is logical.

Let k be the parameter that is used to specify to the system the number of clusters to reach "possibly"—remember that k is not an absolute limit, and the system can try to merge more clusters but it will not "insist" on merging once k is reached.

Assuming k=3, (a, c, d, f) will be clustered while b and e will remain separate.

If k=2, it is likely that a large cluster (a, c, d, e, f) is formed, while b remains separate since it has only 1 connection to c and it is not as "close" (visual distance here as similarity) as e to d, and d being connected to a and f.

This simplified example serves to explain the main principles of the enhanced clustering algorithm implemented by the anomaly engine.

Figure 5:
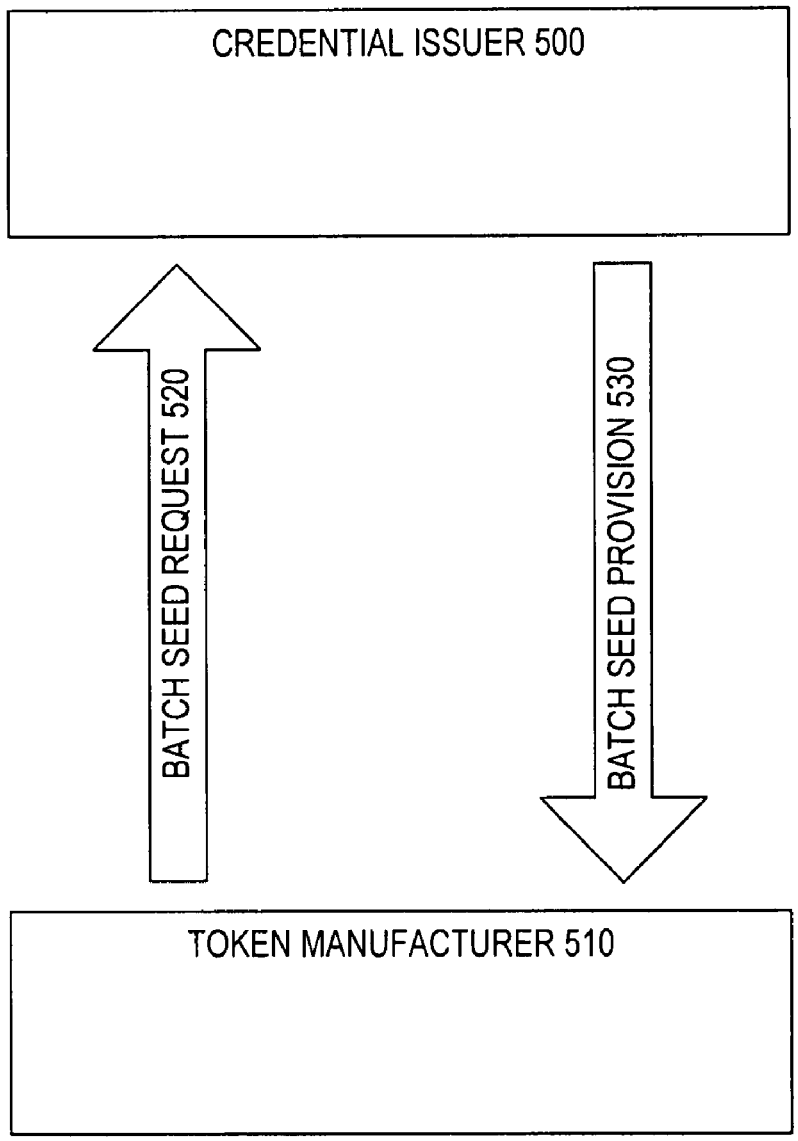
FIG. 5 is a block diagram that depicts a bulk provisioning process in accordance with an embodiment of the present invention.

As shown in FIG. 5 in accordance with an embodiment of the present invention, a credential issuer (500), such as the service provider (100), may provide bulk back-end generation of seeds and their secure transport (530) to a token manufacturer (510) upon request (520). Utilizing a bulk provisioning protocol enables the sending of pre-provisioned tokens—devices that are ready to be activated and used—to users.

The complexity of generating a secret known only by the token or device—used to generate the OTP—and the back-end service—used to validate the OTP—is handled by the issuer (500) and the trusted partner (510) who is manufacturing a specific token or OATH compatible device, for example. An issuer-supplied application—Token Manufacturing Utility (TMU)—may be installed and integrated in a manufacturing facility to allow requests of batches of seeds that are later integrated in the OTP generating devices. This way the device manufacturer (510) can leverage existing processes, without increasing the complexity of the device itself other than the functionality needed to generate and provide for consumption the OTP itself.

In an embodiment of the present invention, the bulk provisioning protocol may be described as follows:
TMU generates a key pair and token ID for each token
the TMU generates a random key pair, which includes a public key, for each token ID
this public key is used transparently as a second parameter in each enrollment request made by the provision command
TMU can enroll for a certificate for each token, with the required token IDs as parameters
an OTP shared secret is always requested for each token ID
optionally, an administrative shared secret may be requested for each token ID as well
TMU may use the Registration Authority key to negotiate the establishment of an authenticated SSL channel. This channel persists until the enrollment process for each token is completed.

Figure 6:
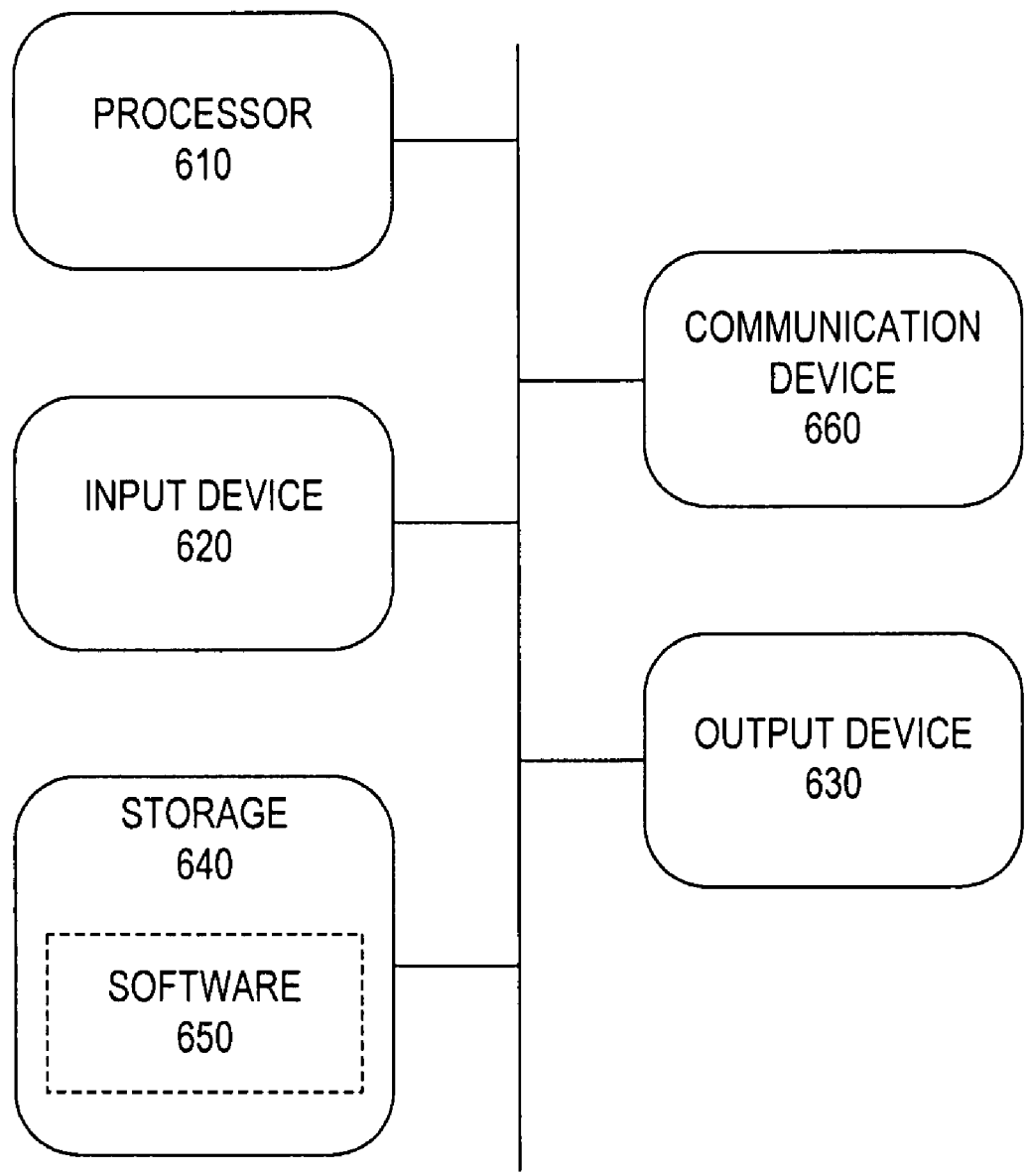
FIG. 6 is a block diagram that depicts a computing device in accordance with an embodiment of the present invention.

The bulk provisioning protocol flow may be described in an embodiment of the invention as follows:

TMU connects to the issuer's provisioning service and enrolls an for OTP certificate and optionally an administrative certificate for each token ID presented the issuer (500) returns the required certificates and shared secret for each token, in encrypted form the issuer (500) stores a copy of the shared secrets at its site; OTP shared secrets are used to calculate the OTP values that are used to authenticate users; an administrative shared secret is used when resetting a lost password the issuer (500) returns the certificates TMU stores the certificates and shared secrets in encrypted form in a local keystore After shared secrets are received from the issuer (500), the token manufacturer (510) embeds them in the correct tokens. The following process may be utilized in accordance with an embodiment of the invention:

extract and decrypt a token ID and shared secret from the local keystore for each token using a list command decrypt the shared secret for each token ID output by the list command, using a secure method embed the shared secret in the correct token using manufacturing process FIG. 6 illustrates the components of a basic computing device in accordance with an embodiment of the present invention, which may include a server running the authentication service (110) or fraud detection service (120), for example. The computing device may be a personal computer, workstation, server, or any other type of microprocessor-based device. The computing device may include one or more of a processor (610), input device (620), output device (630), storage (640), and communication device (660).

The input device (620) may include a keyboard, mouse, pen-operated touch screen or monitor, voice-recognition device, or any other device that provides input. The output device (630) may include a monitor, printer, disk drive, speakers, or any other device that provides output.

The storage (640) may include volatile and nonvolatile data storage, including one or more electrical, magnetic or optical memories such as a RAM, cache, hard drive, CD-ROM drive, tape drive or removable storage disk. The communication device (660) may include a modem, network interface card, or any other device capable of transmitting and receiving signals over a network. The components of the computing device may be connected in any manner, such as via electrical bus or wirelessly.

The software (650), which may be stored in the storage (640) and executed by the processor (610), may include, for example, the application programming that embodies the functionality of the present invention (e.g., as embodied in the authentication service (110) and fraud detection service (120)). The software (650) may include a combination of client applications and enterprise servers such as an application server and a database server.

Communications may occur over any type of network, which may implement any communications protocol, which may be secured by any security protocol. Network links may include telephone lines, DSL, cable networks, T1 or T3 lines, wireless network connections, or any other arrangement that implements the transmission and reception of network signals.

The computing device may implement any operating system, such as Windows, Linux or UNIX. The software (650) may be written in any programming language, such as C, C++, Java, Visual Basic and/or SQL. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

For example, software functionality that implements the present invention such as the authentication service (110) and fraud detection service (120) may comprise several discrete modules that together still provide the same functionality, data specified in the illustrated databases may be spread over several database partitions, databases and/or systems, and the data and flow diagrams of FIGS. 2-3 and 5 may encompass combined steps or several intermediate steps that do not detract from the higher level functionality described therein.

What is claimed is:

1. A method for providing identity protection services, comprising:

receiving at a validation server over a network a response from a credential associated with a user, the credential response provided by the user in order to authenticate the user to one of a plurality of sites on the network that accepts the credential as a factor for authentication;

verifying by the validation server the credential response on behalf of the one network site;

receiving at a fraud detection server over the network information in connection with a transaction associated with the user at the one network site; and evaluating by the fraud detection server the transaction information for suspicious activity based at least in part on information provided to the fraud detection server in connection with one or more transactions at one or more sites on the network other than the one network site.

2. The method of claim 1, wherein the validation server utilizes transaction information provided by the fraud detection server in connection with verifying the credential response provided by the user.

3. The method of claim 1, wherein the fraud detection server utilizes verification information provided by the validation server in connection with evaluating the user's transaction information for suspicious activity.

4. The method of claim 1, wherein the fraud detection server evaluates the transaction information for suspicious activity based at least in part on other information not provided to the fraud detection server in connection with the one or more transactions at the one or more sites on the network other than the one network site.

5. The method of claim 4, wherein the other information is queried from a database associated with the DNS infrastructure of the Internet.

6. The method of claim 5, wherein the other information includes IP geolocation data.

7. The method of claim 1, wherein the step of evaluating by the fraud detection server further comprises:

performing a primary fraud check; and upon determining that the transaction is not suspicious at the primary fraud check, providing to said network site an indication that the transaction is not suspicious.

8. The method of claim 1, wherein the step of evaluating by the fraud detection server further comprises:

performing a primary fraud check; and upon determining that the transaction is suspicious at the primary fraud check, performing a secondary fraud check.

9. The method of claim 8, wherein said secondary fraud check comprises requesting confirmation of a user identity using at least one or more of a telephone, email, or SMS confirmation.

10. The method of claim 1, further comprising:
determining at the fraud detection server that the transaction is fraudulent;
providing to the network site an indication that the transaction is fraudulent; and
receiving, at the fraud detection server, from the network site, identifying information for the fraudulent transaction.

11. The method of claim 10, further comprising:
compiling information associated with a plurality of transactions associated with a particular user;
determining transaction tendencies for the particular user based upon the plurality of transactions;
subsequent to the plurality of transactions, receiving a new transaction associated with said particular user; and
determining that the new transaction is fraudulent based at least in part on a comparison between the transaction tendencies and the new transaction.

12. A system for providing identity protection services, comprising:
a validation server configured to provide an authentication service;
a fraud detection server configured to provide a fraud detection service;
an authentication database communicatively linked to the validation server; and
a fraud detection database communicatively linked to the fraud detection server, wherein
the validation server receives over a network a response from a credential associated with a user, the credential response provided by the user in order to authenticate the user to one of a plurality of sites on the network that accepts the credential as a factor for authentication,
the validation server verifies the credential response on behalf of the one network site,
the fraud detection server receives over the network information in connection with a transaction associated with the user at the one network site, an
the fraud detection server evaluates the transaction information for suspicious activity based at least in part on information provided to the fraud detection server in connection with one or more transactions at one or more sites on the network other than the one network site.

13. The system of claim 12, wherein the validation server utilizes transaction information provided by the fraud detection server in connection with verifying the credential response provided by the user.

14. The system of claim 12, wherein the fraud detection server utilizes verification information provided by the validation server in connection with evaluating the user's transaction information for suspicious activity.

15. The system of claim 12, wherein the fraud detection server evaluates the transaction information for suspicious activity based at least in part on other information not provided to the fraud detection server in connection with the one or more transactions at the one or more sites on the network other than the one network site.

16. The system of claim 15, wherein the other information is queried from a database associated with the DNS infrastructure of the Internet.

17. The system of claim 16, wherein the other information includes IP geolocation data.

* * * * *